(12) United States Patent
Bocking et al.

(10) Patent No.: US 7,792,965 B2
(45) Date of Patent: Sep. 7, 2010

(54) METHOD AND APPARATUS FOR SIMPLIFIED USER ACCESS TO MULTIPLE BROWSER TRANSPORTS IN A MOBILE COMMUNICATION DEVICE

(75) Inventors: Andrew D. Bocking, Waterloo (CA); Robert Bredin, Guelph (CA); Robert Edwards, Waterloo (CA); Mark Sohm, Guelph (CA); Kathryn Ann Wilhelm, Guelph (CA)

(73) Assignee: Research In Motion Limited, Waterloo, Ontario (CA)

( * ) Notice: Subject to any disclaimer, the term of this patent is extended or adjusted under 35 U.S.C. 154(b) by 697 days.

(21) Appl. No.: 11/468,397

(22) Filed: Aug. 30, 2006

(65) Prior Publication Data
US 2008/0059632 A1 Mar. 6, 2008

(51) Int. Cl.
*G06F 15/16* (2006.01)
(52) U.S. Cl. ............... 709/225; 715/234; 715/760; 715/854; 709/218; 709/220; 709/224
(58) Field of Classification Search ............... 709/224, 709/225, 226, 212, 213, 223, 206, 208
See application file for complete search history.

(56) References Cited

U.S. PATENT DOCUMENTS

| | | | |
|---|---|---|---|
| 2001/0056444 A1 | 12/2001 | Ide et al. | |
| 2003/0220925 A1* | 11/2003 | Lior | 707/10 |
| 2004/0078427 A1* | 4/2004 | Gil et al. | 709/203 |
| 2004/0215649 A1* | 10/2004 | Whalen et al. | 707/102 |
| 2005/0193053 A1* | 9/2005 | Kendall et al. | 709/200 |
| 2006/0117091 A1* | 6/2006 | Justin | 709/217 |
| 2006/0217144 A1* | 9/2006 | Bonnelykke Kristensen et al. | 455/550.1 |

FOREIGN PATENT DOCUMENTS

| | | | |
|---|---|---|---|
| EP | 1231548 A | 8/2002 | |
| WO | 2004-038563 A | 5/2004 | |

OTHER PUBLICATIONS http://docs.blackberry.com/en/developers/deliverables/1143/browser_devguide.pdf "Blackberry Browser" Apr. 10, 2007 Research In Motion limitedhttp://www.cisco.com/en/US/docs/net_mgmt/cisco_transport_manager/6.0/user/guide/60ap_ico.pdf.*
http://www.cisco.com/en/US/docs/net_mgmt/cisco_transport_manager/6.0/user/guide/60ap_ico.pdf "Icons and Menus Displayed in CTM"—Cisco Transport Manager Release 6.0.*

* cited by examiner

*Primary Examiner*—Joseph Thomas
*Assistant Examiner*—Randy Scott
(74) *Attorney, Agent, or Firm*—Perry+Currier Inc.

(57) ABSTRACT

System and method are set forth for providing Web access to a user on a mobile communication device. A plurality of browser transports are associated with a single browser icon for display on the mobile communication device, and a predetermined one of the plurality of browser transports is selected for displaying information based on characteristics of the information being requested by the user.

8 Claims, 3 Drawing Sheets

METHOD AND APPARATUS FOR SIMPLIFIED USER ACCESS TO MULTIPLE BROWSER TRANSPORTS IN A MOBILE COMMUNICATION DEVICE

FIELD

The present application relates generally to mobile communication devices and more particularly to a method and system for providing a single browser icon for automatically selecting an appropriate browser transport from among a plurality of available browser transports on a mobile communication device.

BACKGROUND

Mobile communication devices such as wireless personal digital assistants (PDAs) and smart telephones are well known for providing users with services such as email, Web browsing, text messaging, etc. Such devices communicate over a wide variety of networks including data-only networks such as Mobitex and DataTAC as well as complex voice and data networks such as the Global System for Mobile Communications/General Packet Radio Service (GSM/GPRS), Code Division Multiple Access (CDMA), Enhanced Data Rates for Global Evolution (EDGE), Universal Mobile Telecommunications System (UMTS) and CDMA2000 networks.

It is common to provide a separate browser icon entry point for each browser configuration present on the device. Thus, for a corporate user up to three different browser icons may be provided on the device—a corporate enterprise browser, an Internet browser, and a Wireless Application Protocol (WAP) browser.

Although the browsers are quite similar, each has a specific use that the other browsers are unable to duplicate. The corporate enterprise browser is the only browser that can access content inside the user's corporate firewall. The Internet browser is the only browser that can access and browse Internet sites via a hosted service, without requiring access to a corporate enterprise server. WAP is an open international standard for applications that use wireless communication. Thus, a WAP browser is designed to provide all of the basic services of a computer based Web browser but is simplified to operate within the restrictions of a mobile communication device. The WAP browser is the only browser with access to a service provider's portal and carrier-specific subscription services.

Since each of the foregoing specific capabilities is required for a corporate user, it is not possible to simply remove any of the browser configurations from the device. However, a typical user may be expected to find the presence of multiple browser icons confusing and unintuitive. Many users are not aware of the capabilities of the different browsers and simply want to use a browser to browse the Web.

Also, when attempting to access a Web page a user may find that the page is not accessible because, for example, the user's corporate enterprise server is down or off-line or the user is attempting to access a corporate Intranet site using the Internet browser icon rather than the corporate enterprise browser icon.

DETAILED DESCRIPTION

According to an aspect of this specification, a single browser icon entry point is set forth for providing user access to the Web while maintaining the capabilities of the existing browsers to access separate domains (corporate enterprise browser, Internet browser, WAP browser).

According to another aspect, the mobile communication device automatically associates the appropriate browser transport with the single browser icon based on information being requested by the user (e.g. Internet Web site, Intranet site, carrier's subscription service, etc.)

Accordingly, there is provided a method and system for providing Web access to a user on a mobile communication device. A plurality of browser transports are associated with a single browser icon for display on the mobile communication device, and a predetermined one of the plurality of browser transports is selected for displaying information based on characteristics of the information being requested by the user.

By providing a single browser icon entry point, simplified user access is provided to different domains while maintaining the capabilities of the existing browsers. Also, providing automatic association of an appropriate browser transport with the single browser icon addresses the problem of user confusion regarding appropriate browser selection.

Figure 1:
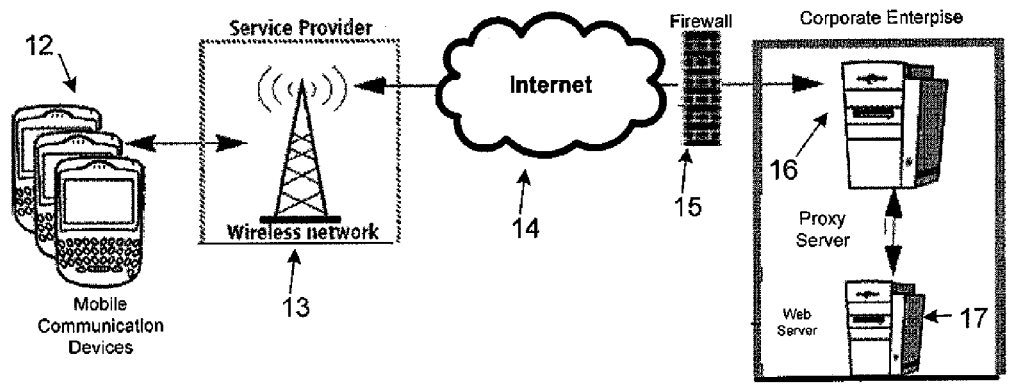
FIG. 1 is a block diagram of a corporate enterprise communication architecture, according to the prior art.

Reference is first made to the corporate enterprise communication architecture shown in FIG. 1. A plurality of mobile communication devices 12 are shown communicating over a wireless network 13 and the Internet 14 to a corporate enterprise through a firewall 15. The mobile communication devices 12 are based on the computing environment and functionality of a wireless personal digital assistant. It is, however, to be understood that devices 12 can include the construction and functionality of other electronic devices, such as cell phones, smart telephones, and the like. As would be understood by one of ordinary skill in the art, wireless network 13 may be a GSM/GPRS, Cellular Digital Packet Data (CDPD), Time Division Multiple Access (TDMA), iDEN Mobitex, DataTAC network, EDGE or UMTS, or a broadband network such as Bluetooth or variants of 802.11.

The corporate enterprise includes a proxy server 16 for providing company controlled, secure, wireless Web access, email access and Personal Information Manager (PIM) synchronization. The proxy server 16 also provides a Mobile Data Service (MDS) for accessing Web content from a Web server 17. The proxy server 16 may also provide email functionality, although such functionality is not germane to this specification. While only one Web server 17 is shown, for illustration purposes, a person of skill in the art will understand that the corporate enterprise could have many such servers for hosting Web sites or graphic download sites, providing access to picture files such as Joint Photographic Experts Group (JPEG), Tagged Image File Format (TIFF), bitmap (BMP), Portable Network Graphics (PNG), Moving Picture Experts Group (MPEG-4), Moving JPEG (MOV), Graphics Interchange Format (GIF), Scalable Vector Graphics (SVG), etc.

In terms of Web browsing functionality, each mobile communication device 12 communicates with proxy server 16 using Hypertext Transfer Protocol (HTTP) over an Internet Protocol (IP) optimized for mobile environments. In some embodiments, the device 12 communicates with the proxy server 16 using either HTTP over Transmission Control Protocol over Internet Protocol (TCP/IP) or a variant of TCP/IP optimized for mobile use (e.g. Wireless Profiled TCP) or over other, proprietary protocols. For example, in some systems HTTP is run over Internet Point-to-Point Protocol (IPPP) and an encrypted Global Messaging Exchange (GME) channel over which datagrams are exchanged to transport data between the mobile communication device 12 and proxy server 16, wherein over proprietary protocols such as (IPPP/GME/MDP), and a Message Delivery Protocol (MDP) is used to separate the GME datagrams into one or more MDP packets which are transported over User Datagram Protocol over Internet Protocol (UDP/IP). The proxy server 16 enables Internet access, preprocesses and compresses Hypertext Markup Language (HTML) and Extensible Markup Language (XML) content from the Web server 17 before sending it to the device 12, transcodes content type, stores HTTP cookies on behalf of the device 12, and supports certificate authority authentications, etc.

In response to a request from the device browser, the proxy server 16 retrieves content from Web server 17 and creates a custom document containing both images to be displayed on the device and data in the form of compressed versions of requested portions of the document. The document is preferably of "multi-part" format to improve transmission to and processing efficiency within the device 12. Specifically, in order to display composite Web pages (i.e. pages composed of a main Wireless Markup Language (WML) or HTML page and one or more related auxiliary files, such as style sheets, JavaScript files, or image files) the device browser is normally required to send multiple HTTP requests to the proxy server 16. However, according to a multi-part generation feature of the proxy server 16, all necessary parts of a composite Web page are preferably posted in a single bundle, thereby enabling the device browser to download all of the required content with a single request. The header in the proxy server response identifies the content as a multi-part bundle (e.g. Multi-Purpose Mail Extensions (MIME)/multipart, as defined by RFC 2112, E. Levinson, March 1997).

Figure 2:
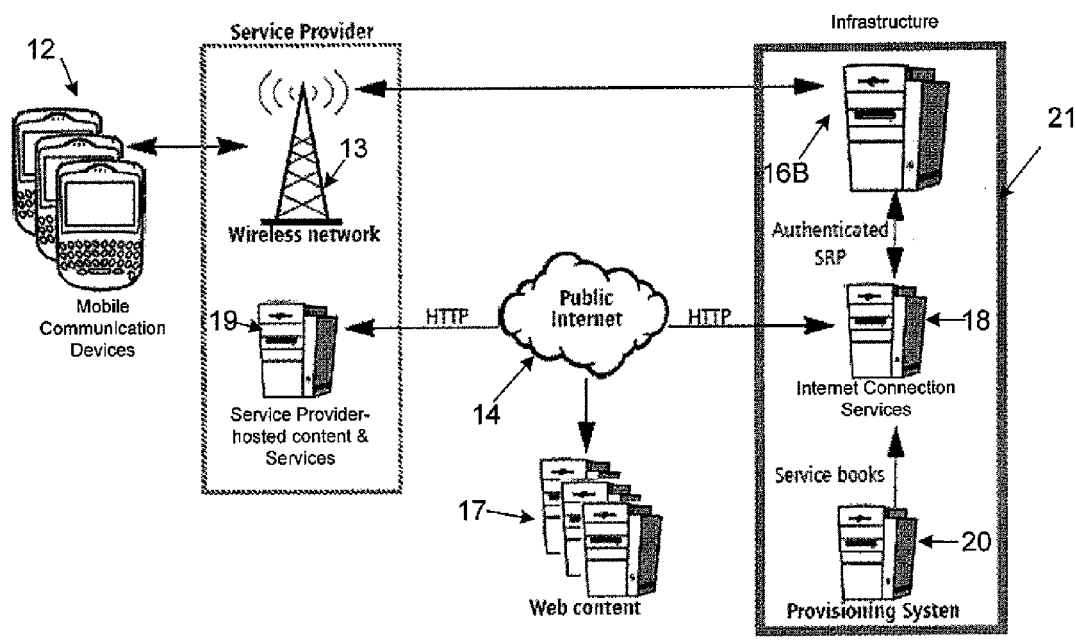
FIG. 2 is a block diagram of a hosted Internet service architecture, according to the prior art.

Whereas users of the mobile communication devices 12 enjoy benefits of Web browsing, wireless Java and other application downloads via proxy server 16, these particular features have at least as much value to a non-corporate "prosumer". Consequently, it is known in the art to provide a hosted Internet service architecture, as illustrated in FIG. 2. Infrastructure 21 includes an authentication server 16, Internet connection service 18 and provisioning system 20. The Internet service of FIG. 2 is deployed through the provisioning system 20, which manages services within the Infrastructure 21, including user accounts, features and profiles, as well as storing subscription information. The user's service provider controls and manages Internet connection service 18 on a per-device/group basis through the provisioning system 20, and may also may host content and services via service provider-hosted content and services 19 (e.g. WAP, HTML, Java archive (JAR), etc.), as well as provide public Internet content 17 access via Internet 14. Service blocking is based on PIN and subscription information stored within provisioning system 20 for each mobile communication device 12. Connectivity and authentication are handled by authentication server 16B using Server Relay Protocol (SRP).

To enable Web access on mobile communication devices 12, appropriate service books are "pushed" (i.e. downloaded) from the provisioning system 20 to the devices 12 (e.g. an IPPP service book to enable communication between a mobile communication device 12 and the Infrastructure 21 using IPPP, a browser configuration service book that contains configuration parameters for the device browser to access the Internet 14, etc.) Upon full registration, all necessary service books for each enabled service are pushed directly to each mobile communication device 12 which, in response, automatically accepts the service books.

In the implementation of FIG. 2, HTML content is simplified and enhanced (i.e. "transcoded") to a format similar to a WAP binary representation of XML (WBXML), which is designed to reduce transmission size of XML data and enable efficient transmission over narrowband wireless communication channels. HTML content is parsed and stripped of extraneous tags and content that the device browser cannot render. Images are scaled down and automatically downsized and converted to a .png format for maximum bandwidth efficiency. Then, the entire Web page is divided into a series of bits (referred to as "tokens") and compressed for display on the mobile communication device 12.

Unlike WAP browser sessions, which must establish a new connection each time the network is accessed, the solution of FIG. 2 uses the existing network connection to the Infrastructure 21. Also, unlike the system of FIG. 1, the Internet browser is a component of the Infrastructure 21 in the hosted solution of FIG. 2. This enables prosumer users of mobile communication devices 12 to access public HTML content 17 on the Internet 14 though service provider-hosted content and services 19 via the Infrastructure 21. It should be noted that, typically, the service offered by the system of FIG. 2 does not support Java applications, TCP sockets, and TripleDES data encryption, nor is there access to Intranets that are protected by firewalls. However, secure HTTP (HTTPS) and Secure Sockets Layer (SSL) may be supported if appropriate libraries have been uploaded to the mobile communication device 12.

Figure 3:
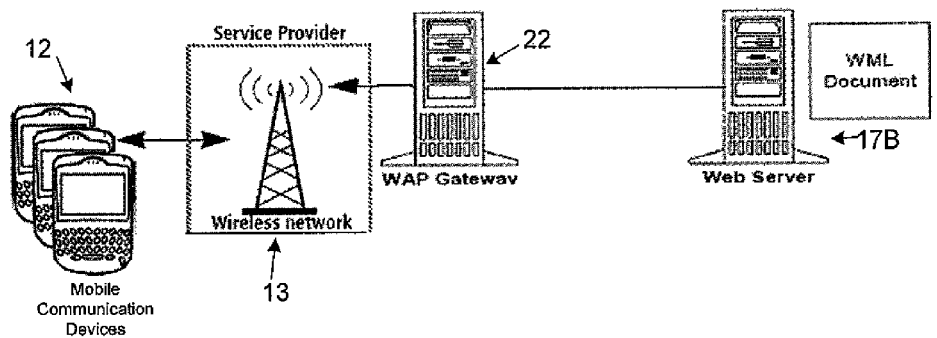
FIG. 3 is a block diagram of a WAP architecture, according to the prior art.

With reference to FIG. 3, mobile communication devices 12 access documents stored in Mobile internet sites, or WAP sites on a server 17B, via a WAP gateway 22. The WAP sites are Websites written in, or dynamically converted to WML and accessed via the WAP browser icon on a mobile communication device 12.

Figure 4A:
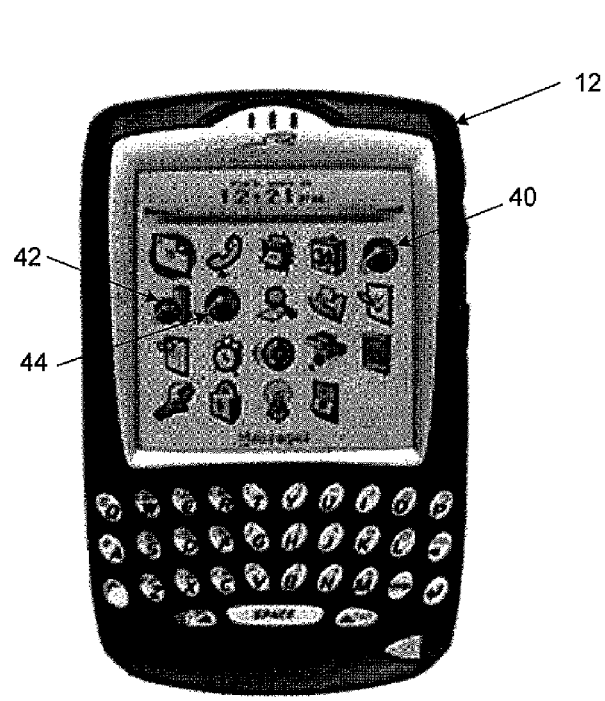
FIG. 4A shows a prior art mobile communication device graphical user interface for accessing multiple browser platforms via respective browser icons.

Turning to FIG. 4A, a prior art mobile communication device 12 is shown with an LCD display 30 depicting numerous icons for launching applications within the device, including an Internet Browser icon 40, a corporate enterprise browser 42, and a WAP browser 44. As discussed above, the presence of multiple browser icons 40, 42 and 44 can be confusing and unintuitive to the user.

Figure 4B:
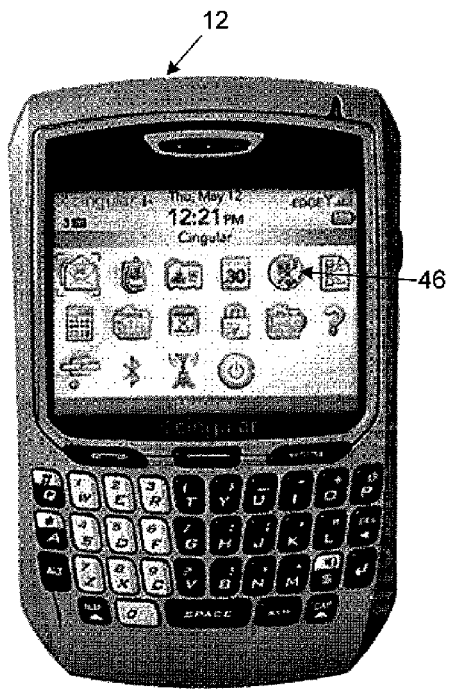
FIG. 4B shows a mobile communication device graphical user interface for accessing multiple browser platforms via a single browser icon, according to an exemplary embodiment.

Therefore, as shown in FIG. 4B, a mobile device browser 12 is provided with a single browser icon 46 as an entry point for providing user access to the Web while maintaining the capabilities of the existing browsers to access separate domains (corporate enterprise browser, Internet browser, WAP browser).

Figure 5:
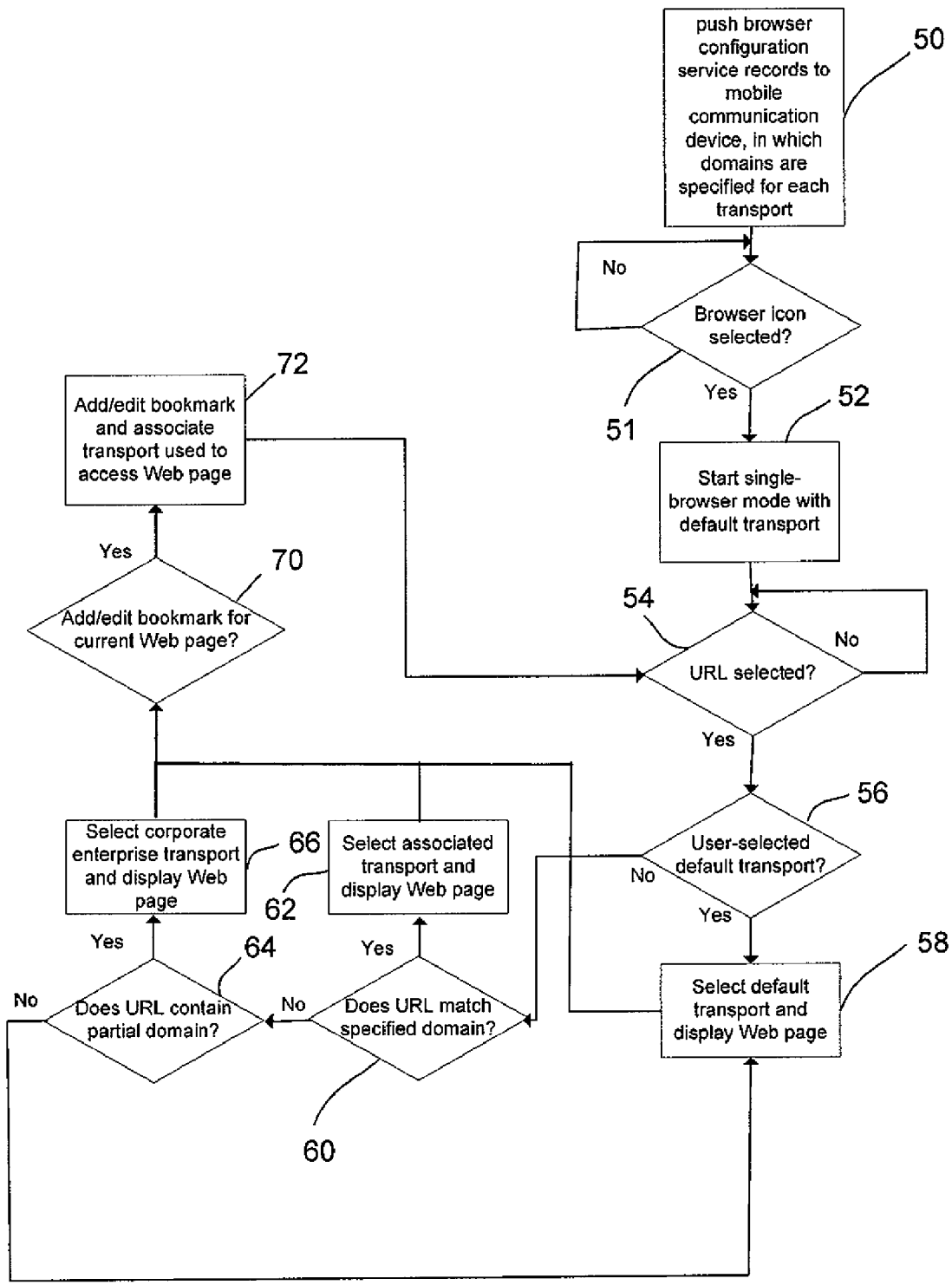
FIG. 5 is a flowchart showing a method of implementing access to multiple browser platforms via a single browser icon and automatically associating an appropriate browser transport with the single browser icon, according to the exemplary embodiment.

With reference to FIG. 5, a flowchart is set forth showing steps in a method for providing the single-browser icon functionality of FIG. 4B. Initially, at step 50, the proxy server 16 pushes browser configuration service records to the mobile communication devices 12, for use in associating the single browser 46 to an appropriate transport. The association is made in accordance with a specified priority. Typically, the order of priority is 1) corporate enterprise transport, 2) Internet browser transport, and lastly 3) WAP browser transport. Thus, the corporate enterprise transport is given first priority if present (i.e. downloaded from the provisioning server 20), followed by the Internet browser transport, followed by the WAP browser transport. It should be noted that this priority scheme preferably does not involve any 'stepping-down' retry mechanism wherein the next priority transport is selected only if the initial transport fails, as this would require excessive time to implement and would likely be aborted by the user before being completed. Instead, the mobile device 12 preferably tries the highest available transport and simply reports any errors to the user.

The configuration service records downloaded to the mobile communication devices 12 also specify a default home page and a list of domains associated with each transport. The latter association permits URLs to be automatically accessed using the appropriate transport, without any user interaction. Thus, for example, a service provider can specify domains within their content and services system 19 so that any requests to those domains are handled by the WAP transport. Likewise, the Internet Browser configuration record preferably specifies an Infrastructure domain for all traffic to go through in order to ensure that the users' subscription services will function. In addition, partial domains (e.g. http://livelink, http://intranet, etc.) not explicitly listed in a browser configuration preferably default to the corporate enterprise transport, as discussed below.

The configuration settings established by the provisioning sever 20 may, nonetheless, be changed by the user (e.g. by providing a choice field in the device configuration screen to specify which transport is being changed).

In response to the user clicking the browser icon 46 (step 51), the device browser starts in single-browser mode, selects a default browser transport according to the priority scheme set forth above (step 52), and displays one of either the default home page associated with that transport or a bookmarks screen (not shown), depending on the browser setting.

Then, at step 54, in response to the user entering a URL in a "go to" dialog of the device user interface (not shown), or selecting a URL link in an email, etc., the device 12 responds in one of four ways. At step 56, if the user has explicitly set the default transport, then the device 12 uses the specified transport (step 58) for the remainder of the session for all URLs entered until the user exits the browser. At step 60, if the domain matches a specified domain associated with any of the browser configuration service books then the associated transport is used (step 62). At step 64, if the URL contains a partial domain then the corporate enterprise transport is used (step 66). Otherwise, the default transport is selected (step 58). Thereafter, the selected browser transport is used until the user enters another URL (e.g. via the "go to" dialog) or selects a bookmark from the bookmark list.

All bookmarks also preferably have a transport associated with them to allow the proper transport to be used on subsequent visits to the bookmark. Thus, when the user has visited a Web page and decides to add a bookmark for that page (step 70), the mobile communication device 12 adds the bookmark and associates it with the transport that was originally used to fetch the page (step 72). The user nonetheless has the option to change the transport (e.g. by using an "edit bookmark" dialog in the user interface). The transport associated with the bookmark is used to request the bookmark and is then used on any links followed from the original bookmark page or subsequent pages. The browser reverts back to the transport selection methodology of steps 56-66 if the user enters a further URL (step 54), or alternatively another associated transport is used if the user selects another bookmark from their bookmark list.

Bookmarks that are restored from a previous code version will have a transport associated with them the first time they are used. The chosen transport is based on the folder that they are in. For example, in the case of WAP bookmarks the default WAP transport is associated whereas corporate enterprise browser bookmarks use the default corporate enterprise browser transport.

While the embodiment described herein is directed to a particular implementation for associating transports with URLs and Web page bookmarks, it will be understood that the steps described hereinabove are not limited to the order in which they are described. The steps described can be performed in any suitable order as may occur to those skilled in the art.

Many other modifications and variations may occur to those skilled in the art. All such modifications and variations are believed to be within the sphere and scope of the present application.

What is claimed is:

1. A method for providing Web access on a mobile communication device, comprising:

downloading browser configuration service records to said mobile communication device;

associating a plurality of browser transports with a single browser icon for display on said mobile communication device, wherein said associating is in accordance with a predetermined priority sequence, said predetermined priority sequence comprising associating a corporate enterprise browser transport, followed by associating an Internet browser transport, followed by associating a WAP browser transport; and selecting a predetermined one of said plurality of browser transports according to said predetermined priority sequence for displaying information based on characteristics of said information being requested.

2. The method of claim 1, further comprising associating a list of domains with each transport to permit URLs associated with said domains to be accessed using an associated browser transport.

3. The method of claim 2, wherein selecting said predetermined one of said plurality of browser transports further comprises one of selecting a specified default browser transport, or selecting the browser transport associated with a specified domain in said list of domains, or selecting a corporate enterprise transport if the requested information contains a partial domain.

4. A system for providing Web access, comprising:

a server computer storing a plurality of configuration service records for associating a plurality of browser transports with a single browser icon, wherein said plurality of browser transports comprises a corporate enterprise browser transport, an internet browser transport, and a WAP browser transport associated by said configuration service records with said single browser icon in accordance with a predetermined priority sequence; and a mobile communication device for executing a browser application for selecting a predetermined one of said plurality of browser transports and displaying information based on characteristics of said information being requested.

5. The system of claim 4, wherein said configuration service records further include a default home page for each of said browser transports.

6. The system of claim 5, wherein said configuration service records further include a list of domains associated with each transport to permit URLs associated with said domains to be accessed using an associated browser transport.

7. The system of claim 6, wherein said browser application further includes logic for selecting one of either a specified default browser transport, the browser transport associated with a specified domain in said list of domains, or a corporate enterprise transport if the requested information contains a partial domain.

8. The system of claim 7, wherein said browser application further includes logic for associating one of said plurality of browser transports with a bookmark for a Web page displayed on said mobile communication device.

* * * * *